(12) United States Patent
Zahdeh

(10) Patent No.: US 6,401,880 B1
(45) Date of Patent: Jun. 11, 2002

(54) BRAKE ROTOR HAVING COOLING PASSAGEWAYS WITH SUBSTANTIALLY CONSTANT CROSS-SECTIONS

(75) Inventor: Akram R. Zahdeh, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/820,590

(22) Filed: Mar. 30, 2001

(51) Int. Cl.[7] .............................................. F16D 65/10
(52) U.S. Cl. ............................ 188/218 X; 188/264 AA
(58) Field of Search ...................... 188/218 XL, 264 A, 188/264 AA, 18 A

(56) References Cited

U.S. PATENT DOCUMENTS

| | | | |
|---|---|---|---|
| 3,933,228 A | 1/1976 | Otto et al. | 188/218 XL |
| 4,083,435 A | 4/1978 | Gallus et al. | 188/218 XL |
| 4,164,993 A | 8/1979 | Kobelt | 188/218 XL |
| 4,867,284 A * | 9/1989 | Okamura et al. | 188/218 XL |
| 5,005,676 A * | 4/1991 | Gassiat | 188/264 AA |
| 5,161,652 A | 11/1992 | Suzuki | 188/218 XL |
| 6,119,820 A * | 9/2000 | Steptoe | 188/218 XL |
| 6,142,267 A | 11/2000 | Sporzynski et al. | 188/218 XL |
| 6,164,423 A * | 12/2000 | Dickerson | 188/218 XL |

* cited by examiner

Primary Examiner—Matthew C. Graham
(74) Attorney, Agent, or Firm—Laura C. Hargitt

(57) ABSTRACT

A brake rotor for an automotive vehicle braking system is disclosed. The rotor includes a brake rotor hat portion attached to a brake rotor disk portion. The disk includes a plurality of radially extending passageways separated by a plurality of webs. The passageways have substantially constant area cross-sections for cooling the rotor and may be dimensionally symmetrical as well.

4 Claims, 3 Drawing Sheets

BRAKE ROTOR HAVING COOLING PASSAGEWAYS WITH SUBSTANTIALLY CONSTANT CROSS-SECTIONS

TECHNICAL FIELD

The present invention relates to brake rotors for automotive vehicles.

BACKGROUND OF THE INVENTION

Generally, automotive vehicle braking systems include brake rotors that are contacted by brake pads during braking to assist in slowing or stopping an automotive vehicle. It is desirable to cool the brake rotors before, during and after braking. It is known to circulate air through passageways in brake rotors to remove heat from the rotors. However, the circulation of air may be hindered by the geometry of the passageways. Additionally, the passageways may lower the desired stiffness of the rotor. Therefore, it would be desirable to provide an improved brake rotor structure that offers improved airflow through the passageways without sacrificing control over rotor rigidity.

SUMMARY OF THE INVENTION

The present invention meets the above needs by providing a brake rotor for an automotive vehicle brake system having a brake rotor hat with an annular mounting portion that includes a circular flat surface. A first set of apertures extends through the flat surface for receiving fasteners for attachment to a vehicle wheel and wheel hub. Another aperture extends through the surface for alignment with the wheel hub. The rotor hat also includes a cylindrical wall connected to the circular surface. The cylindrical wall includes a cylindrical surface, a first end and a second end. A peripheral flange having a first surface and a second surface extends radially outward from the second end of the cylindrical wall and terminates in a free edge. A plurality of webs are spaced circumferentially about and extend radially outward from the outer cylindrical surface and each of the webs has a first wall and a second wall. Each of the webs further includes a first side attached to the cylindrical wall, a second side attached to the peripheral flange, a third rounded free side and a fourth side. The first wall and the second wall of the webs are spaced so the webs increase in thickness as they extend radially outward and the first wall is generally parallel over a substantial portion of its surface to an opposing surface of a second wall of an adjacent web for at least partially defining passageways extending radially outward. An annular ring is attached to the fourth side of the webs and has a first surface, a second surface, an inner peripheral edge and an outer peripheral edge. The second surface of the annular ring is opposing and substantially parallel to the second surface of the flange. The inner edge is opposing and spaced apart from a central portion of the outer cylindrical surface of the cylindrical wall for cooperatively forming openings into the passageways with the webs. Furthermore, the openings have cross-sectional dimensions substantially similar to cross-sectional dimensions of the passageways.

BRIEF DESCRIPTION OF THE DRAWINGS

These and other objects, features, aspects, and advantages of the invention will become apparent upon consideration of the specification and appended drawings in which.

DESCRIPTION OF PREFERRED EMBODIMENT

Figure 1:
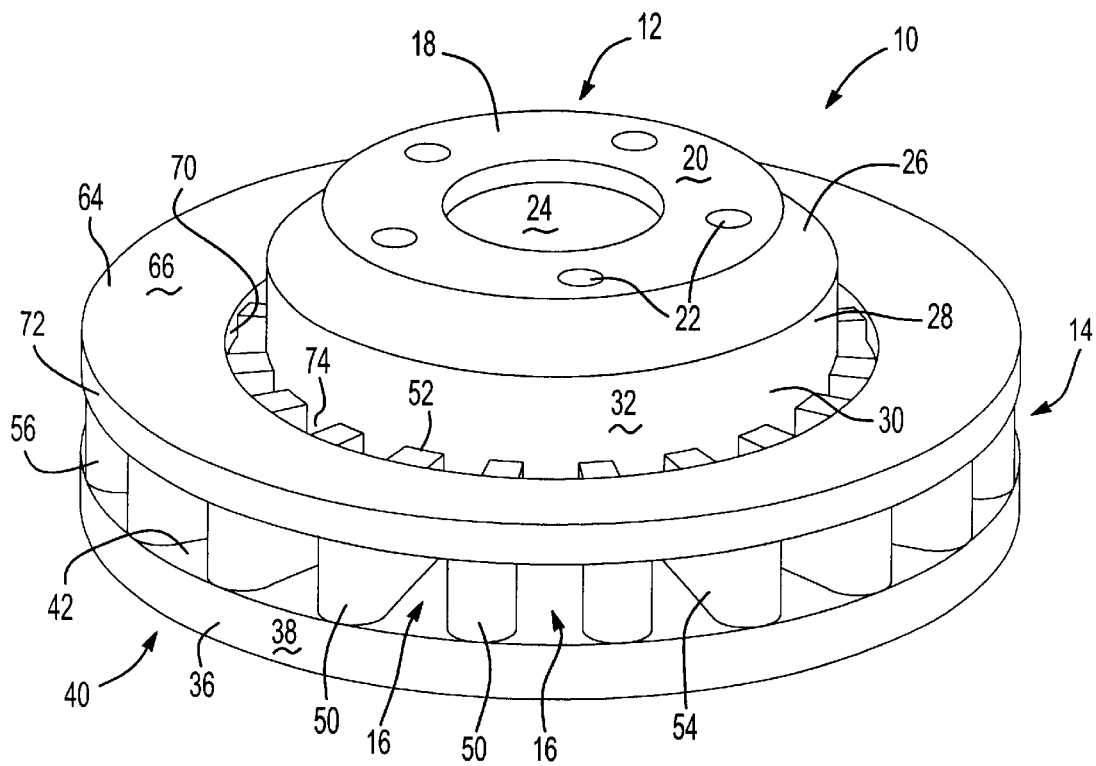
FIG. 1 is a perspective view of a brake rotor.
Figure 2:
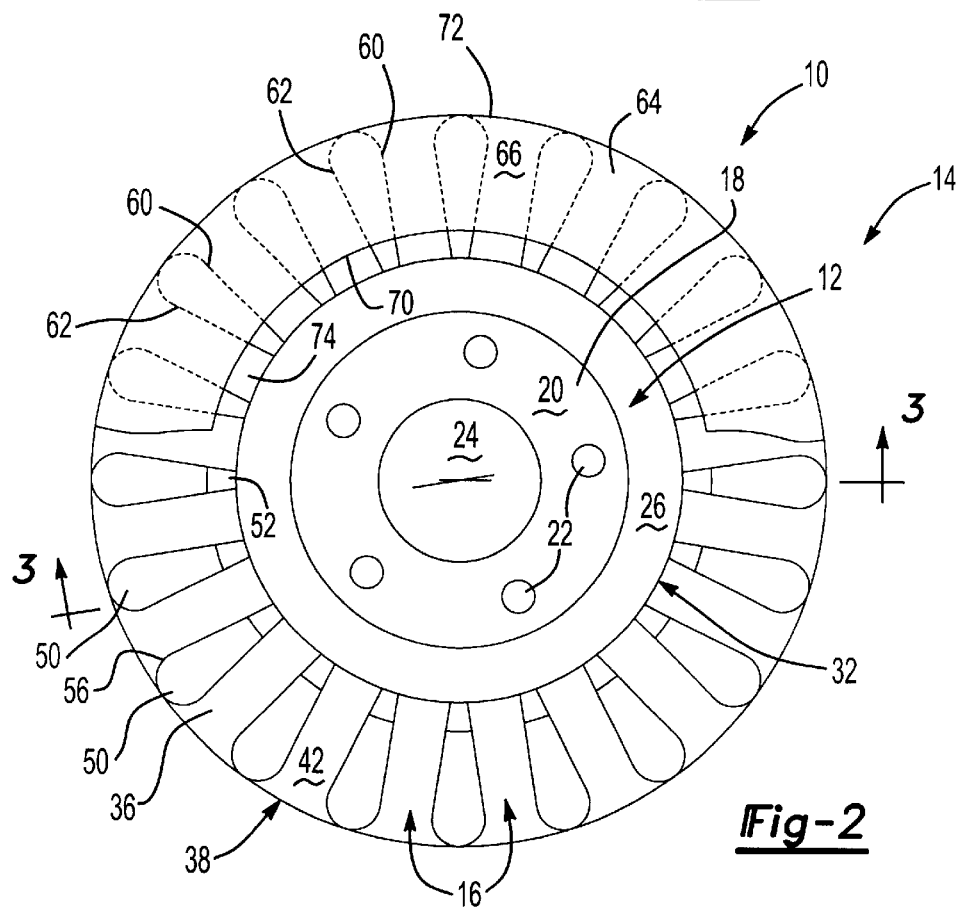
FIG. 2 is a top partial cut away view of the brake rotor of FIG. 1.
Figure 3:
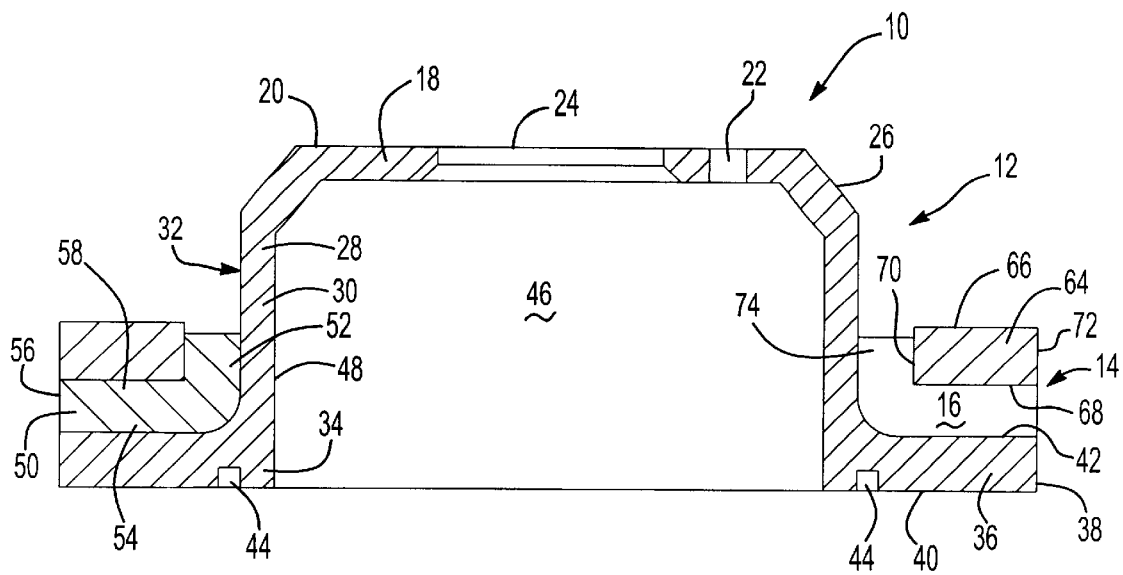
FIG. 3 is a sectional view of the brake rotor of FIG. 1 taken along line 3—3.

Referring now to FIGS. 1 through 3, there is illustrated a brake rotor 10 having a cup-shaped brake rotor hat portion 12 attached to a brake rotor disk portion 14 wherein the rotor 10 is appropriate for placement in either front or rear wheels of an automotive vehicle. The brake rotor disk 14 includes a plurality of passageways 16 advantageously dimensioned to promote airflow through the passageways 16 for removing heat from the brake rotor 10 before, during or after periods of braking.

The brake rotor hat portion 12 is generally cylindrical with a mounting portion 18 that includes a circular flat surface 20. A plurality of apertures 22 is defined in the flat surface 20 for receiving lugs, studs, bolts or the like, for attaching the brake rotor 10 to a wheel and a wheel hub of an automotive vehicle. Another aperture 24 for aligning with the wheel hub extends through the center of the mounting portion 18 and is concentric with the circular surface 20 of the mounting portion 18.

The rotor hat portion 12 further includes a tapered wall surface 26 connected to the mounting portion 18 and adjoining a first end 28 of a cylindrical wall 30 of the hat 12. The cylindrical wall 30 includes an outer cylindrical surface 32 extending between the first end 28 of the wall 30 and a second end 34 of the wall 30.

A peripheral flange 36 of the disk 14 extends radially outward from the second end 34 of the cylindrical wall 30 of the rotor hat 12 and terminates at a free edge 38. The flange 36 has a first surface 40 and a second surface 42 separated by a substantially uniform thickness over at least a substantial portion of its radial dimension, as the flange 36 extends radially outward. The flange 36 includes an annular channel 44 in the first surface 40 appropriate for receiving a cap (not shown) for housing a parking brake package (not shown) in a cavity 46 of the rotor 10 that is at least partially defined by an inner surface 48 of the cylindrical wall 30.

The disk 14 further includes a plurality of webs 50 spaced circumferentially about and extending radially outward from the outer cylindrical surface 32 of the cylindrical wall 30. Each of the webs 50 includes a first side 52 attached to the cylindrical wall 30 of the rotor hat portion 12, a second side 54 attached to the peripheral flange 36, a third rounded free side 56 and a fourth side 58. Each of the webs 50 also includes a first wall 60 and a second wall 62 extending radially outward from the cylindrical wall 30 wherein the first wall 60 is separated from the second wall 62 by a thickness of the web 50 that increases as the web 50 extends radially outward. The first wall 60 of each web 50 is generally parallel over a substantial portion of its surface to an opposing surface of a second wall 62 of an adjacent web 50 for at least partially defining the passageways 16.

The disk portion 14 includes an annular ring 64 with a first surface 66 and a second surface 68 separated by a substantially uniform thickness. The second surface 68 is attached to the fourth side 58 of the webs 50 and is substantially parallel to the second surface 42 of the flange 36. The ring 64 includes an inner peripheral edge 70 and outer peripheral edge 72. The inner edge 70 is spaced apart from and opposes a central portion of the outer cylindrical surface 32 of the cylindrical wall 30. The inner edge 70, the outer cylindrical surface 32 and the webs 50 form openings 74 providing access for the passage of air into the passageways 16. The second surface 68 of the ring 64, the first and second walls 60, 62 of the webs 50 and the second surface 42 of the flange 36 cooperatively define the passageways 16.

The inner edge 70 is spaced away from the outer cylindrical surface 32 such that the openings 74 have cross-sectional dimensions that are substantially similar or substantially identical in size and shape to the cross-sectional dimensions of the passageways 16. The cross-sectional dimensions of the openings 74 are oriented such that a cross-section of a given opening could be rotated 90° about the inner edge 70 to substantially align with the cross-sectional dimensions of the passageways 16. Such dimensional symmetry allows any debris that may enter the openings 74 to more easily pass through the openings 74 and the passageways 16, thus, maintaining airflow through the passageways 16.

Furthermore, the passageways 16 extend radially away from the cylindrical wall 30 without dimensional rotation (i.e., a cross-section of a passageway 16 taken at a first radial distance away from the cylindrical wall 30 will be in substantially registered alignment with a cross-section taken a second further radial distance away). Such radial dimensional symmetry of the passageways 16 also assists in purging debris.

The rotor 10 attaches to a vehicle so that the openings 74 open away from the underbody of the vehicle or toward the normal position of a hubcap for a wheel of the vehicle. This obviates the need for a splash-guard over the openings 74 of the rotor 10, thus, allowing greater airflow to the openings 74. Consequently, the passageways 16 will experience greater airflow resulting in greater heat transfer away from the rotor 10, thereby extending the useful life of the rotor 10.

Figure 4:
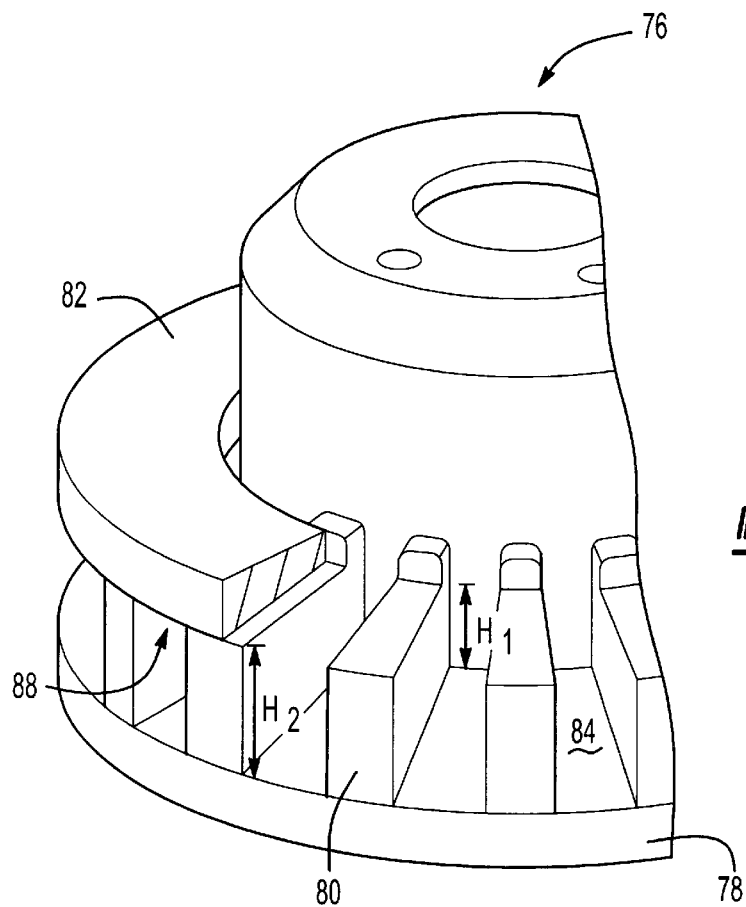
FIG. 4 is a perspective cut away view of another brake rotor.
Figure 5:
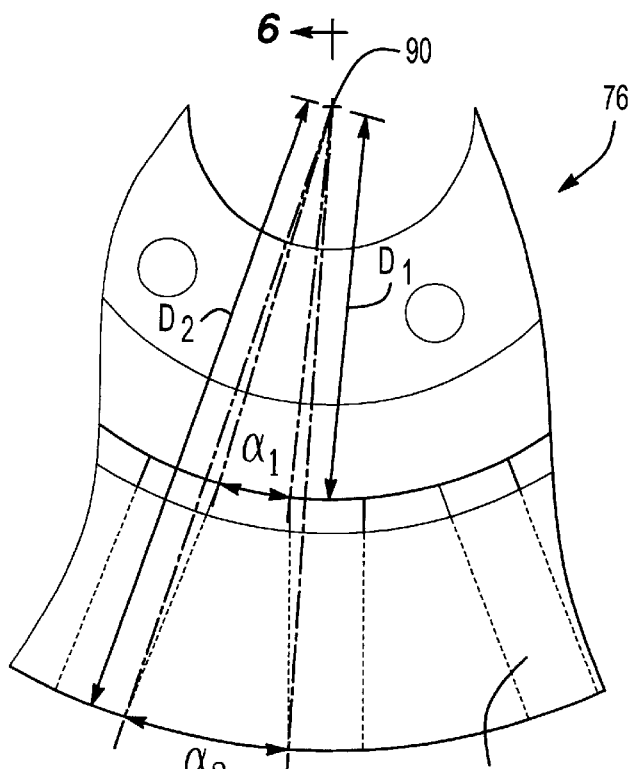
FIG. 5 is a top view of a portion of the brake rotor of FIG. 4.
Figure 6:
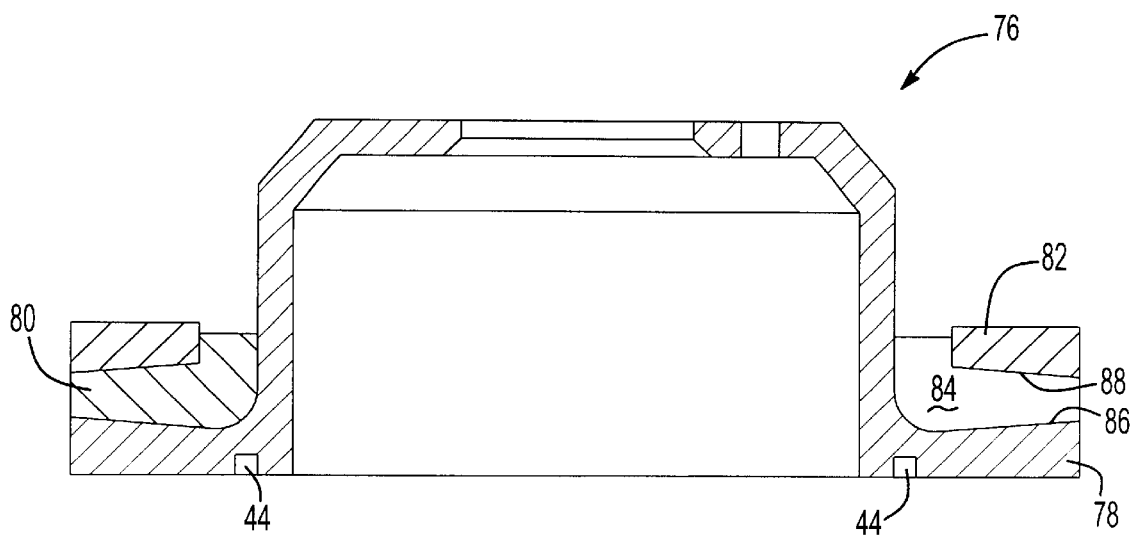
FIG. 6 is a sectional view of the brake rotor of FIGS. 4 and 5 taken along line 6—6.

Now, referring to FIGS. 4 through 6, there is illustrated an alternative brake rotor 76 that is substantially identical to the brake rotor 10 of FIGS. 1 through 3 with the exception that the peripheral flange 36, the webs 50 and the annular ring 64 have been replaced with a peripheral flange 78, webs 80 and annular ring 82, which cooperatively form passageways 84.

The peripheral flange 78 of the rotor 10 includes a surface 86 that is angled toward the passageways 84 as the flange 78 extends radially outward, thus, increasing the thickness of the flange 78 as it extends radially outward. The annular ring 82 also includes a surface 88 that is angled toward the passageways 84 as the ring 82 extends radially outward, thus, increasing the thickness of the ring 82 as it extends radially outward. The surface 88 of the ring 82 generally opposes the surface 86 of the flange 78 and the webs 80 are generally of uniform thickness.

Preferably, and as shown best in FIGS. 6 and 7, the cross-sectional area of the passageways 84 is substantially radially uniform although the dimensions of the passageways 84 may be changing as they extend radially. The dimensions of the passageways 84 change according to the equation:

$$H_2 = H_1 \frac{D_1 \sin\left(\frac{\alpha_1}{2}\right)}{D_2 \sin\left(\frac{\alpha_2}{2}\right)}$$

Wherein:
$H_1$ is a height of a rectangular cross section of one of the passageways 84 taken at a radial distance $D_1$ away from a radial center point 90 of the rotor 76;

$H_2$ is a height of a rectangular cross section of one of the passageways 84 taken at a greater or lesser radial distance $D_2$ away from the radial center point 90 of the rotor 76;

$\alpha_1$ is an angle defined by three points, one, the vertex, at the radial center point 90 of the rotor 76 and the other two at intersection points wherein the opposing walls of two adjacent webs 80 intersect with the radial distance $D_1$ from the center point 90; and $\alpha_2$ is an angle defined by three points, one, the vertex, at the radial center point 90 of the rotor 76 and the other two at intersection points wherein the opposing walls of two adjacent webs 80 intersect with the radial distance $D_2$ from the center point 90.

In alternative embodiments to the rotors shown, both the thickness of the webs, and the thickness of the flange, the annular ring or both may increase further peripherally outward to maintain constant cross-sectional area passageways.

Any of the rotors discussed herein may be fabricated as an integral metal part according to known techniques, or assembled from separate components.

It should be understood that the invention is not limited to the exact embodiment or construction, which has been illustrated and described but that various changes may be made without departing from the spirit and the scope of the invention.

What is claimed is:

1. A brake rotor for an automotive vehicle braking system comprising:
   a) a brake rotor hat including,
      i) a mounting portion that includes a circular flat surface, a first set of apertures for receiving fasteners for attachment to a vehicle wheel and an aperture for alignment with a hub of said wheel;
      ii) a cylindrical wall connected to said mounting portion and having an outer cylindrical surface, a first end and a second end;
   b) a peripheral flange extending radially outward from said second end of said cylindrical wall and terminating in a free edge, said flange having a first surface and a second surface;
   c) a plurality of webs spaced circumferentially about and extending radially outward from said outer cylindrical surface of said cylindrical wall, each of said webs having a first wall and a second wall, a first side attached to said cylindrical wall, a second side attached to said peripheral flange, a third rounded free side and a fourth side, said first wall and said second wall being spaced so said webs increase in thickness as they extend radially outward, said first wall being generally parallel over a substantial portion of its surface to an opposing surface of a second wall of an adjacent web for at least partially defining passageways extending radially outward;
   d) an annular ring attached to said fourth side of said webs and having a first surface, a second surface and an inner and outer peripheral edge, said second surface of said ring opposing and substantially parallel to said second surface of said flange, said inner edge opposing and spaced apart from a central portion of said outer cylindrical surface of said cylindrical wall for cooperatively forming openings into said passageways with said webs, said openings having cross-sectional dimensions substantially similar to cross-sectional dimensions of said passageways.

2. A brake rotor as in claim 1, wherein said rotor is designed to be installed in a vehicle having an underbody, said rotor designed to have said openings open away from said underbody of said vehicle.

3. A brake rotor for an automotive vehicle braking system in an automotive vehicle having an underbody, said rotor comprising:

a) a brake rotor hat having a cylindrical wall with an outer cylindrical surface, a first end and a second end;

b) a peripheral flange having a generally flat surface, said flange extending radially outward from said second end of said cylindrical wall and terminating in a free edge, said flat surface angling toward constant cross-sectional area passageways as said passageways and said flange extend radially outward;

c) a plurality of webs spaced circumferentially about and extending radially outward from said outer cylindrical surface of said cylindrical wall, each of said webs having a first wall and a second wall separated by a substantially uniform thickness for at least partially defining said passageways, each of said webs also having a first side attached to said cylindrical wall, a second side attached to said peripheral flange and a third rounded free side and a fourth side; and d) an annular ring attached to said fourth side of said webs and having a flat surface and an inner and outer peripheral edge, said flat surface of said ring angling toward said passageways as said ring extends radially outward, said inner edge opposing is and spaced apart from a central portion of said outer cylindrical surface of said cylindrical wall for cooperatively forming openings into said passageways with said webs, said openings having cross-sectional areas substantially similar to cross-sectional areas of said passageways, said rotor designed to have said openings open away from said underbody of the vehicle.

4. A brake rotor as in claim 3, wherein dimensions of said constant cross-sectional areas of said passageways are rectangular and change according to the equation:

$$H_2 = H_1 \frac{D_1 \sin\left(\frac{\alpha_1}{2}\right)}{D_2 \sin\left(\frac{\alpha_2}{2}\right)}$$

wherein:

$H_1$ is a height of said rectangular cross section of one of said passageways taken at a radial distance $D_1$ away from a radial center point of said rotor, $H_2$ is a height of a rectangular cross section of said one of said passageways taken at a radial distance $D_2$ away from said radial center point of said rotor, said distance $D_2$ being different than said distance $D_1$, $\alpha_1$ is an angle defined by three points, a vertex at said radial center point of said rotor and a pair of intersection points wherein opposing walls of two adjacent webs intersect with said radial distance $D_1$ from said center point; and $\alpha_2$ is an angle defined by three points, said vertex and a pair of intersection points wherein the opposing walls of said two adjacent webs intersect with the radial distance $D_2$ from the center point.

* * * * *